United States Patent
Jain et al.

(10) Patent No.: US 12,457,094 B2
(45) Date of Patent: Oct. 28, 2025

(54) CONSISTENT DOCUMENT MODIFICATION

(71) Applicant: ADOBE INC., San Jose, CA (US)

(72) Inventors: Sanyam Jain, New Delhi (IN); Ashish Jain, New Delhi (IN)

(73) Assignee: Adobe Inc., San Jose, CA (US)

( * ) Notice: Subject to any disclaimer, the term of this patent is extended or adjusted under 35 U.S.C. 154(b) by 275 days.

(21) Appl. No.: 18/054,028

(22) Filed: Nov. 9, 2022

(65) Prior Publication Data

US 2024/0154787 A1     May 9, 2024

(51) Int. Cl.
*H04L 9/06*     (2006.01)

(52) U.S. Cl.
CPC .................................. *H04L 9/0643* (2013.01)

(58) Field of Classification Search
CPC ...................................................... H04L 9/0643
See application file for complete search history.

(56) References Cited

U.S. PATENT DOCUMENTS

| | | | | |
|---|---|---|---|---|
| 7,424,673 B2 * | 9/2008 | Broman | ................ | G06F 40/166 715/243 |
| 8,479,094 B2 * | 7/2013 | Fouts | ...................... | G06F 40/10 715/255 |
| 8,620,872 B1 * | 12/2013 | Killalea | ................ | G06F 40/134 707/687 |
| 10,042,935 B1 * | 8/2018 | Perkins | ................. | G06F 16/532 |
| 11,194,958 B2 * | 12/2021 | Maneriker | ............. | G06N 20/00 |
| 11,481,545 B1 * | 10/2022 | Aviles | ................... | G06F 40/186 |
| 12,159,103 B1 * | 12/2024 | Khoo | ..................... | G06F 40/106 |
| 2006/0171588 A1 * | 8/2006 | Chellapilla | .......... | G06V 30/245 382/187 |
| 2007/0061714 A1 * | 3/2007 | Stuple | .................. | G06F 40/166 715/248 |
| 2008/0189600 A1 * | 8/2008 | Lau | ........................ | G06F 40/154 715/235 |
| 2010/0257182 A1 * | 10/2010 | Saliba | .................. | G06F 40/253 707/747 |
| 2013/0246906 A1 * | 9/2013 | Hamon | ................... | H04L 67/02 715/234 |
| 2013/0290837 A1 * | 10/2013 | Hudetz | ................ | G06F 40/106 715/255 |

(Continued)

*Primary Examiner* — Jason Chiang
(74) *Attorney, Agent, or Firm* — Shook, Hardy & Bacon L.L.P.

(57) ABSTRACT

Systems and methods for consistent document modification are provided. Embodiments include accessing a first document that comprises a first document object, where the first document object has a first document object style. The embodiments further comprise accessing a second document that comprises a second document object, where the second document object has a second document object style. The first document object style is to be modified based on the second document object style. The embodiments include hashing the first document object style to generate a first document object style hash, and hashing the second document object style to generate a second document object style hash. Based on determining the first document object style hash is different from the second document object style hash, the first document object is modified, within the first document, to comprise a modified first document object style that corresponds to the second document object style.

20 Claims, 13 Drawing Sheets

(56) References Cited

U.S. PATENT DOCUMENTS

| | | | |
|---|---|---|---|
| 2014/0032513 A1* | 1/2014 | Gaither | G06F 16/90344 707/698 |
| 2014/0223274 A1* | 8/2014 | Nakamura | G06F 16/9577 715/205 |
| 2015/0161087 A1* | 6/2015 | Khoo | G06F 16/957 715/234 |
| 2017/0052747 A1* | 2/2017 | Cervelli | G06T 11/001 |
| 2017/0097920 A1* | 4/2017 | Zhang | G06F 40/154 |
| 2018/0267950 A1* | 9/2018 | de Mello Brandao | G06F 40/30 |
| 2019/0147034 A1* | 5/2019 | Maneriker | G06F 40/253 704/9 |
| 2019/0179956 A1* | 6/2019 | Krasadakis | G06F 40/35 |
| 2019/0370918 A1* | 12/2019 | Pemmaraju | G06F 16/335 |
| 2020/0265113 A1* | 8/2020 | Dubey | G06F 40/103 |
| 2020/0394235 A1* | 12/2020 | Liu | G06F 8/38 |
| 2021/0174017 A1* | 6/2021 | Genilloud | G06F 18/231 |
| 2021/0312122 A1* | 10/2021 | O'Donncha | G06F 40/30 |
| 2023/0418881 A1* | 12/2023 | Guo | G06F 40/103 |
| 2024/0296602 A1* | 9/2024 | Mehra | G06F 3/04845 |

\* cited by examiner

FIRST DOCUMENT DATA

| STYLE # | FIRST DOC STYLE ID | FIRST DOC OBJECT STYLE ATTRIBUTES | FIRST DOCUMENT OBJECT STYLE HASH |
|---|---|---|---|
| STYLE 1 | 312 | • CENTER<br>• BOLD<br>• ALL CLIPS<br>• BLUE<br>• TNR 18 FNT | 185 203 236 22... |
| STYLE 2 | 412 | • JUSTIFIED<br>• INDENT .5 IN<br>• TNR 12 FNT | 3 228 27 130... |
| STYLE 3 | 455 | • STAR<br>• CENTER<br>• 3 IN BY 3 IN<br>• BOLD EDGES | 87 23 244 15... |
| STYLE 4 | 178 | • TNR 12 FNT<br>• 2 COLUMNS<br>• .5 IN SEPARATED | 87 88 14 43... |

*FIG. 4.*

| STYLE # | SECOND DOC STYLE ID | SECOND DOC OBJECT STYLE ATTRIBUTES | SECOND DOCUMENT OBJECT STYLE HASH |
|---|---|---|---|
| STYLE 1 | 312 | • CENTER<br>• BOLD<br>• ALL CLIPS<br>• BLUE<br>• TNR 18 FNT | 185 203 236 22... |
| STYLE 2 | 412 | • JUSTIFIED<br>• INDENT .5 IN<br>• TNR 12 FNT | 3 228 27 130... |
| STYLE 3 | 625 | • STAR<br>• CENTER<br>• 3 IN BY 3 IN<br>• BOLD EDGES<br>• 3-DIMENSIONAL | 37 61 106 224... |
| STYLE 4 | 215 | • TNR 12 FNT<br>• JUSTIFIED | 81 172 224 211... |

SECOND DOCUMENT DATA

*FIG. 5.*

| FIRST DOCUMENT OBJECT STYLE HASH | SECOND DOCUMENT OBJECT STYLE HASH | = 1<br>≠ 0 |
|---|---|---|
| 185 203 236 22... | 185 203 236 22... | 1 |
| 3 228 27 130... | 3 228 27 130... | 1 |
| 87 23 244 15... | 37 61 106 224... | 0 |
| 87 88 14 43... | 81 172 224 211... | 0 |

*FIG. 7.*

CONSISTENT DOCUMENT MODIFICATION

BACKGROUND

The technology generally relates to document editing. More specifically, the technology relates to editing a document so that it has a style similar to the style of another document. Document editors use styles to format objects, such as text or images. These styles can be selected and applied to text within a document. Some document editors allow customization of styles so users can create a style and apply it to a document.

SUMMARY

At a high level, aspects herein relate to modifying documents in a manner consistent with another document. For example, a first document is being modified at a computing device. The first document is to be modified so it is consistent with a second document stored at a remote location.

The first document comprises a first document object, such as text or an image, which has a first document object style, such as a color, font, size, effect, and the like. The first document is compared to the second document to determine if there are conflicts between the first document object style and a second document object style of a second document object in the second document.

To determine whether a conflict exists, the first document object style is input to a hashing algorithm that outputs a first document object style hash. The second document object style is input to the hashing algorithm that outputs a second document object style hash in response. The first document object style hash is compared to the second document object style hash. If the hashes are the same, then there is no conflict, as the first document object style is the same as the second document object style. However, if the hashes are different, then there is a conflict, and the first document object style is different from the second document object style.

Upon determining the first document object style hash is different from the second document object style hash, the first document object can be modified to have the same style as the second document object. In this way, the first document object of the first document has a modified first document object style that corresponds to the second document object style, thereby making the first document at least partially consistent with the second document. Metadata associated with the first document can be changed to indicate the modified first document object style and its corresponding hash. The metadata can be used in future comparisons when comparing the modified first document to other documents.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 4 is an example of first document data that is associated with the first document of FIG. 2, in accordance with an aspect described herein;

FIG. 5 is an example of second document data that is associated with the second document of FIG. 3, in accordance with an aspect described herein;

FIG. 7 is a comparison between first document object style hashes of the first document data and second document object style hashes of the second document data, in accordance with an aspect described herein;

DETAILED DESCRIPTION

Figure 1:
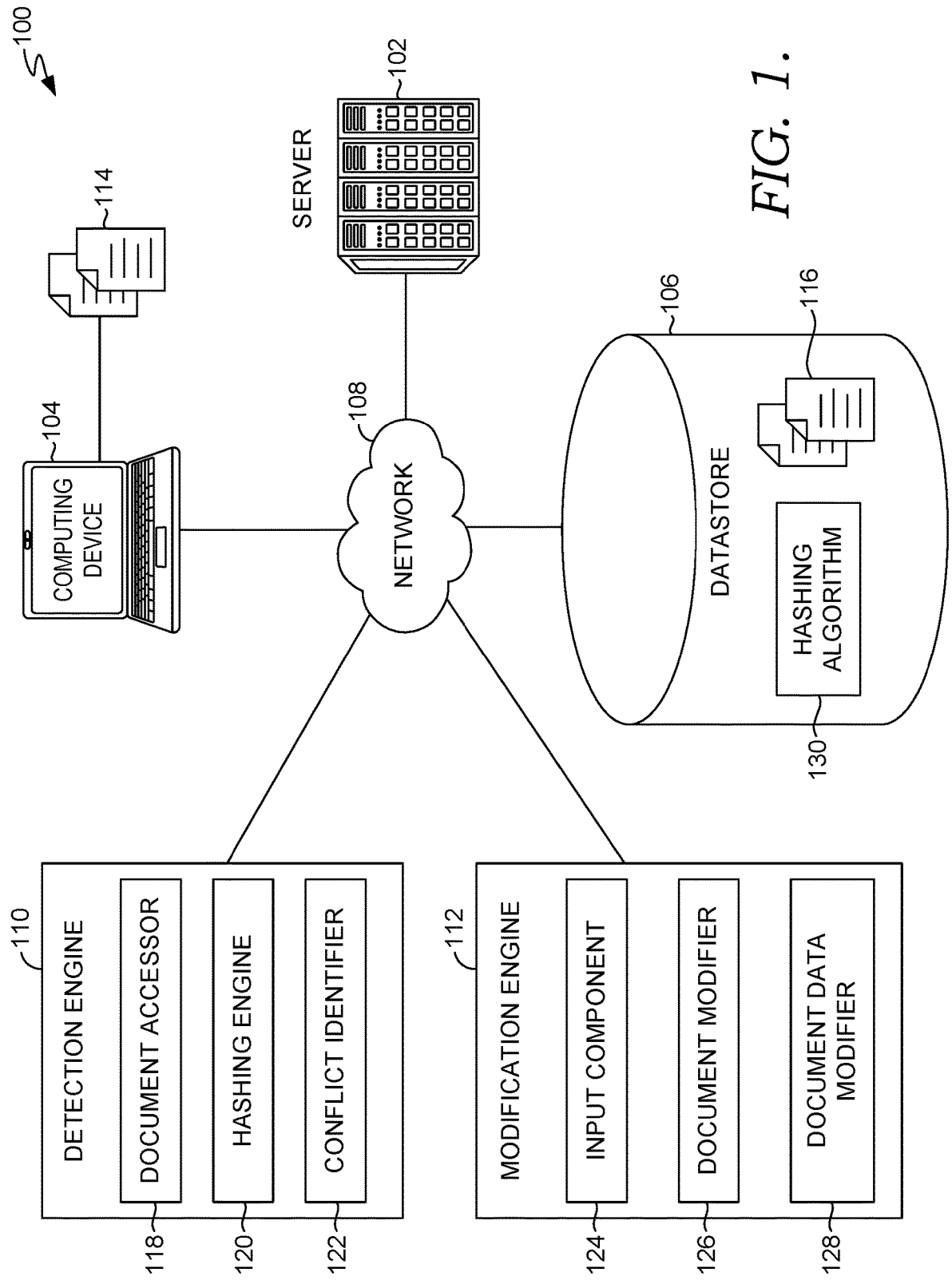
FIG. 1 is an example operating environment in which aspects of the technology may be employed, in accordance with an aspect described herein.

Document modification can be a challenging task. This is particularly true when trying to modify large numbers of existing documents to have a consistent style. For instance, this scenario often arises in the context of brand materials. That is, companies have a large number of documents, including advertisements, flyers, letterhead, graphics, and so on. When a company changes its branding scheme or profile, then new documents are created or existing documents are modified to be consistent with the new brand guidelines.

Conventional methods are time consuming and require a relatively large amount of computer processing power to modify documents in a consistent manner. One historical method is to manually identify differences between documents and modify a document to be consistent when detecting discrepancies. This requires a human to review the new document or document guidelines, identify the new styles, and make changes to a new or existing document that are consistent with the new style. For example, a human might view a document and identify a title of the document is in a style that is blue font, all caps, centered, and bolded. The person then identifies the title on a new or existing document to see if it has the same style. If not, the person changes the style on the new or existing document so it also has blue font, all caps, is centered, and bolded. Thus, when making these changes, a person reviews the actual style of the object that is understandable to the person. That is, the person can visually detect the color, font style, font size, and the like, and then select a style that matches their observations. Sometimes, however, these observations maybe incorrect, as the differences between styles can be nuanced.

For a computer, however, this comparison method to identify discrepancies in document object styles requires a large amount of processing power and is sometimes prone to errors. For instance, a title of the document will have multiple style attributes to form the style of the title. Continuing with the same example, the title may have style attributes such as blue font, all caps, centered, and bolded. When comparing documents to see if the styles are consistent, the computer could compare each style attribute individually.

This can be problematic, however, because the style attributes may not be in a consistent order from document to document. For instance, a first document might have a title with metadata that indicates the title is blue font, all caps, centered, and bolded. A second document might have metadata that indicates its title is bolded, centered, blue font, and all caps. This could result in the computer indicating a false positive inconsistency between the documents, although stylistically the titles the same.

The problems are compounded because documents may use many different styles. The title may have one style, while the body of the document has another. The header may have yet another different style. Further, other objects can have styles too. Text may have a large selection of different colors, fonts, spacing sizes, boarders, and so on. Geometric shapes may have various positions, multidimensional sizes, boarder colors and styles, boarder thicknesses, fill colors, and so forth. Document graphics may also have styles that include attributes such as colors, stroke styles, fill styles, design and paint effects, and so forth. Other documents having document object styles comprising style attributes are contemplated and intended to be within the scope of this disclosure. In all, comparing each of these style attributes one to one across documents increases the probability of errors in comparisons and requires a significant demand on the computer processor to make the comparisons.

The present technology provides examples of methods that alleviate some of these problems, including reducing the probability of false positive errors, while also reducing the computer processing requirements to make the comparisons and execute modifications to documents relative to conventional methods.

To do so, a first document is accessed by a computing device. The computing device may be creating or editing the first document. The first document has a first document object, such as text, a geometric shape, a graphic, and the like. The first document object has a first document object style, which generally comprises the style attributes that define the visual characteristics of the first document object.

In general, the first document is to be formatted in a manner consistent with a second document. The second document comprises a second document object, such as text, a geometric shape, a graphic, and the like, that has a second document object style. The second document object may include a visual representation of the second document or may describe the visual characteristics that define the style attributes or visual of the second document object style.

To format the first document in a manner consistent with the second document, one or more conflicts are detected between document styles. When conflicts are detected, the conflicts can be resolved by modifying the first document. A conflict is generally a difference between styles. For example, a conflict exists when the first document object style is different from the second document object style.

To determine whether there is a conflict between document styles, the first document object style can be represented as a first document object style hash, and the second document object style can be represented as a second document object style hash. The hashes are compared. If the hashes are the same, there is no conflict. However, if the hashes are different then there is a conflict. The hashes are stored as part of document data, such as metadata, associated with the documents. As noted, there may be multiple styles used between documents, and each style may include many different style attributes. Comparing the hashes is a computationally less expensive way to determine whether there are differences between style attributes of document objects in documents relative to some of the conventional methods.

If a conflict is detected by determining the first document object style hash is different from the second document object style hash, the modification can be made to the first document object. Since the second document object style is different as determined by the different hashes, one or more of the style attributes of the second document object style are retrieved from the stored data. These style attributes are then applied to the first document object to generate a modified first document object style, which is now consistent with the second document object style for the corresponding second document object. The data for the first document can be modified to include the modified first document object style and its associated style attributes for future use in determining conflicts. In all, this method provides a way to quickly identify and update documents so they are consistent with another document.

Thus, as noted previously, the present technology, among other improvements, reduces the computing resource requirements for identifying and modifying documents in a consistent manner. They further improve upon conventional systems by reducing false positive errors when detecting document inconsistencies. The technology further allows for rapidly updating large quantities of documents to be consistent with another document. Thus, time can be spend creating or editing a document to have a particular desired style, and then remaining and new documents can be quickly updated or created in a manner consistent with the desired style.

It will be realized the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and datastore 106, which are communicating via network 108.

Datastore 106 generally stores information including data, computer instructions (e.g., software program instructions, routines, or services), or models used in embodiments of the described technologies. Although depicted as a single database component, datastore 106 may be embodied as one or more datastores or may be in the cloud. In some aspects, datastore 106 is representative of a distributed storage network maintaining a distributed ledger.

Network 108 may include one or more networks (e.g., public network or virtual private network "VPN") as shown with network 108. Network 108 may include, without limitation, one or more local area networks (LANs) wide area networks (WANs), or any other communication network or method.

Generally, server 102 is a computing device that implements functional aspects of operating environment 100, such one or more functions of detection engine 110 and modification engine 112, to facilitate document modification. One suitable example of a computing device that can be employed as server 102 is described as computing device 1300 with respect to FIG. 13. In implementations, server 102 represents a back-end or server-side device.

Computing device 104 is generally a computing device that may be used to generate or modify documents in a consistent manner. One suitable example of a computing device that can be employed as computing device 104 is described as computing device 1300 with respect to FIG. 13. In implementations, client device 104 is a client-side or front-end device. In addition to server 102, computing device 104 may implement functional aspects of operating environment 100, such as one or more functions of detection engine 110 and modification engine 112, to modify documents in a consistent manner. It will be understood some implementations of the technology will comprise either a client-side or front-end computing device, a back-end or server-side computing device, or both executing any combination of functions from detection engine 110 and modification engine 112, among other functions, to modify documents in manner that is consistent with the style of another document.

Having identified various components of operating environment 100, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to detection engine 110 and modification engine 112, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as datastore 106. Moreover, functions of detection engine 110 and modification engine 112 may be performed by server 102, computing device 104, or any other component, in any combination.

Using detection engine 110 and modification engine 112, components of FIG. 1 can generate or modify a document to be consistent with another document. For example, computing device 104 may generate or modify first document 114 so it is consistent in style with second document 116. In general, "document" is intended to include any computer record for which a computer program can be used to change a style of an object within the computer record. For instance, a document may take the form of an electronic spreadsheet, canvas, paper, slide, note, and so forth. Documents, such as first document 114 and second document 116, include document objects to which the styles may be applied, thus providing a visual characteristic of the object.

In an example application of the technology, first document 114 is generated or modified by computing device 104, and is stored on a datastore local to computing device 104. Second document 116 may be maintained by a separate entity and stored on a datastore that is remote from computing device 104 and is assessable by the entity that maintains second document 116. In the example illustrated, second document 116 is stored at datastore 106. In this example, first document 114 is to be modified by computing device 104 so it is consistent in style with second document 116. Likewise, second document 116 may be edited and stored in datastore 106 at any time. As such, the detection engine 110 can be employed to detect whether there are conflicts in style between first document 114 and second document 116 whenever first document 114 is generated or opened from a previously saved version.

Figure 2:
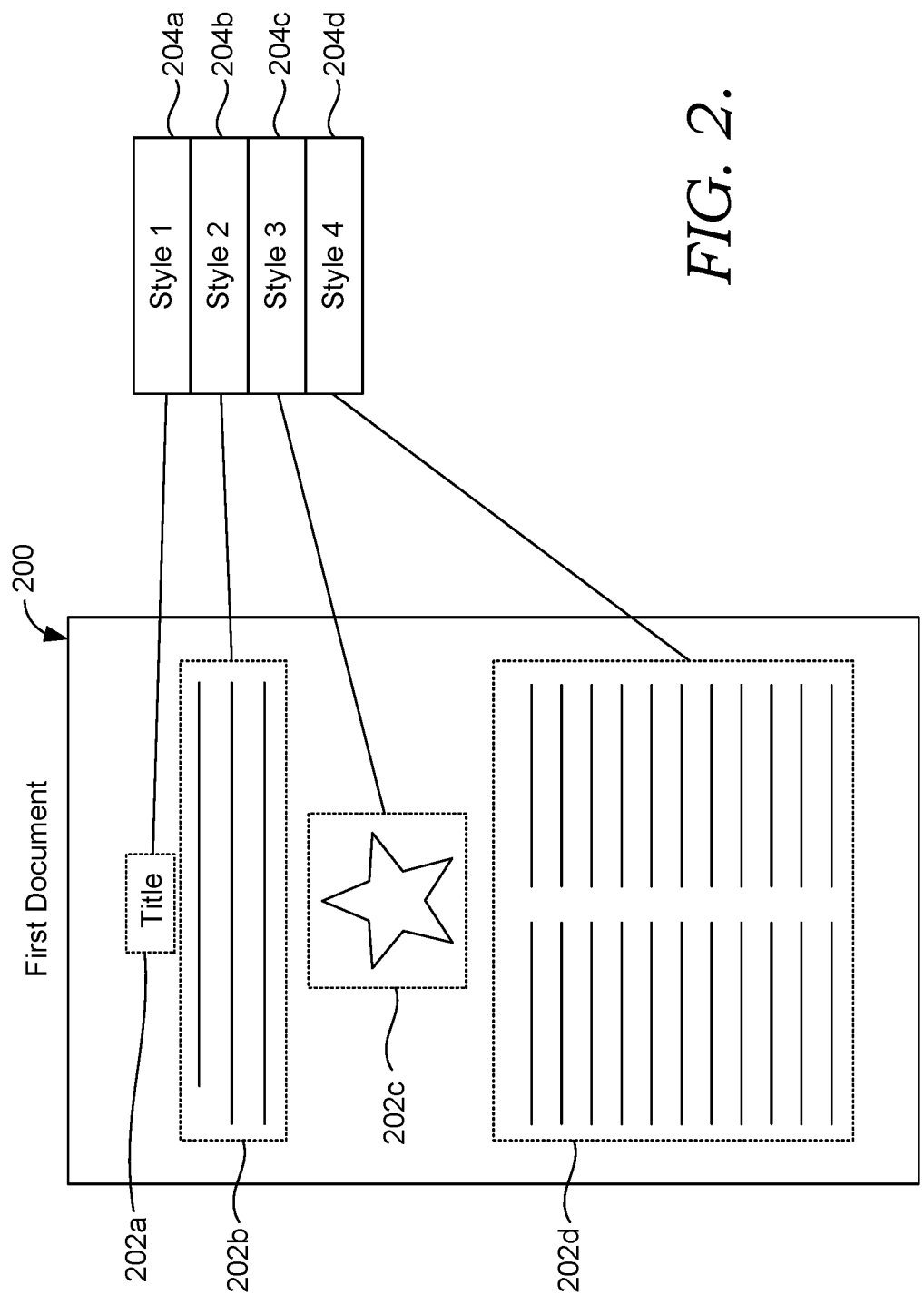
FIG. 2 is an example first document comprising first document objects having first document object styles, in accordance with an aspect described herein.

In general, first document 114 comprises a first document object that has a first document object style. FIG. 2 is provided to illustrate an example. FIG. 2 illustrates an example first document 200. First document 200 is one example that can be used as first document 114 of FIG. 1.

As illustrated in FIG. 2, first document 200 comprises a plurality of first document objects 202a-202d. In this example, first document object 202a, first document object 202b, and first document object 202d comprise text, while first document object 202c comprises a graphic. Each of the plurality of first document objects 202a-202d has a corresponding first document object style, illustrated respectively as the plurality of first document object styles 204a-204d.

Referring back to FIG. 1, as noted, first document 114 is to be modified so it is consistent with second document 116. In general, second document 116 is intended to represent any document having a document object. Second document 116 may also represent a description of one or more document object styles that are to be applied to first document 114. Put another way, in an aspect, second document 116 comprises a visual effect of a second document object that has a second document object style.

Figure 3:
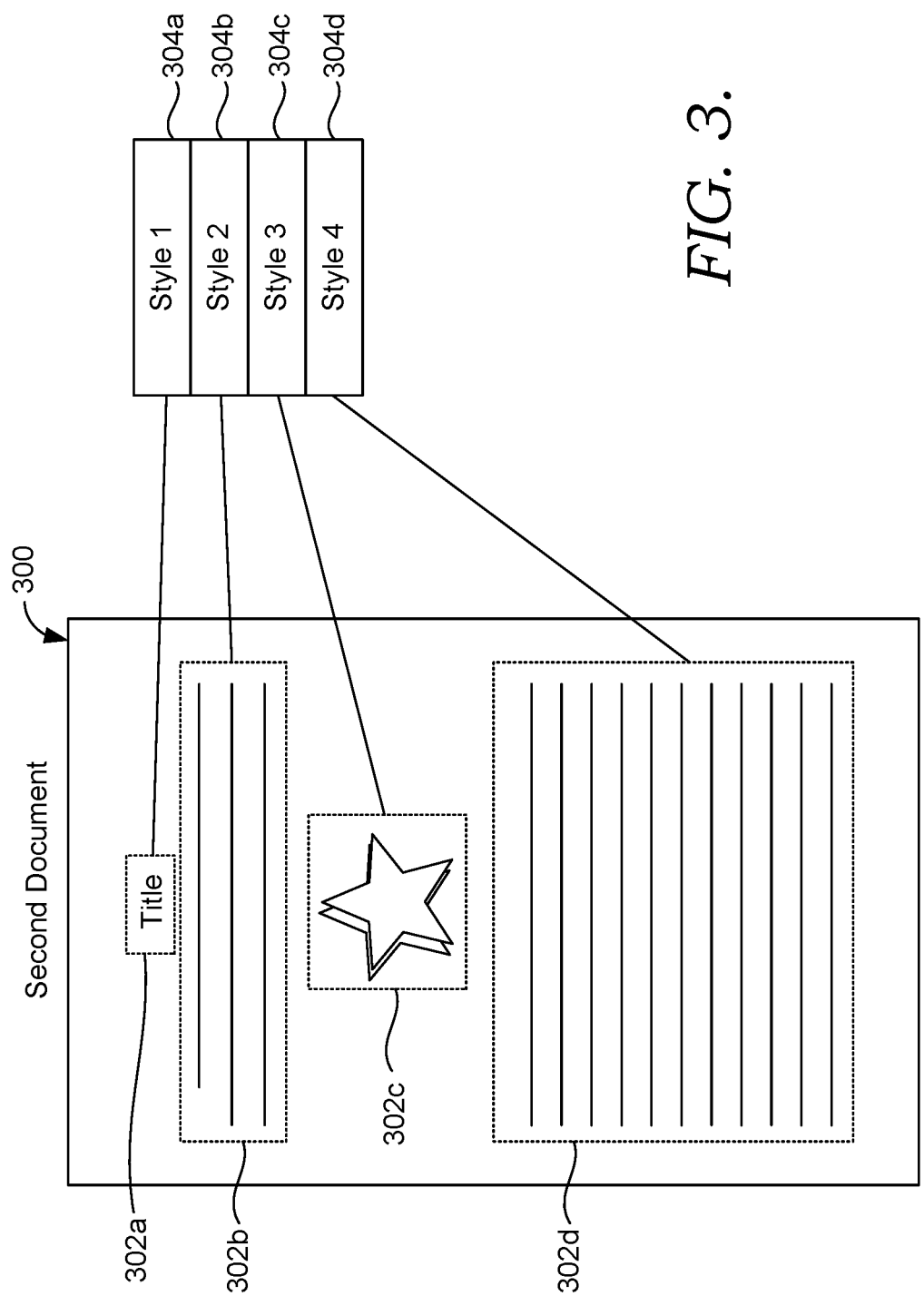
FIG. 3 is an example second document comprising second document objects having second document object styles, in accordance with an aspect described herein.

FIG. 3 illustrates an example second document 300 that can be used as second document 116 of FIG. 1. Here, second document 300 comprises a plurality of second document objects 302a-302d. Similarly, in this example, each of the plurality of second document objects 302a-302d is respectively associated with a plurality of second document object styles 304a-304d. In in this example, second document object 302a, second document object 302b, and second document object 302d comprises text while second document object 302c comprises a graphic.

Turning back to FIG. 1. Each of first document 114 and second document 116 may comprise associated data, which could be in the form of metadata. Thus, first document 114 may be associated with first document data. Second document 116 may be associated with second document data. The document data for each respective document may comprise the object styles that have been applied to the objects. In some cases, these styles include a style ID (identifier) that identifies the style. Each style is differentiated by a set of one or more style attributes, which may also be included with the associated data. As will be further described, each style may comprise a unique document object style hash generated by a hashing algorithm.

FIG. 4 and FIG. 5 provide example illustrations of first document data 400 and second document data 500, respectively, which may be stored with reference to first document 114 and second document 116, or be in the form of metadata respectively associated with first document 114 and second document 116.

First document data 400 comprises first document object styles, such as first document object style 402 and first document object style 410. In general, the first document object styles are representative of those that may be provided as the plurality of first document objects 202a-202d of FIG. 2. With reference still to FIG. 4, each of the first document object styles may have a first document style ID that uniquely identifies the first document object styles. In the illustrated example, first document object style 402 is associated with first document object style ID 404 to identify first document object style 402 in first document data 400. Similarly, first document object style 410 is associated with first document object style ID 412 in first document data 400.

Moreover, each of the first document object styles may have one or more first document object style attributes that cause a visual effect for a document object to which the first document object styles are applied. In this example, first document object style 402 comprises first document style attributes 406, which include, center, bold, all caps, blue color, and times new roman eighteen point font. First document object style 410 comprises first document style attributes 414, which includes star, center, 3-inch by 3-inch size, and bold edges. These are just some examples, and it will be realized that other styles may have various combinations of one or more style attributes. As an illustrative example, first document object style 402 may be applied to and correspond with the visual effect of first document object 202a, while first document object style 410 may be applied to and correspond with the visual effect of first document object 202c in FIG. 2.

Continuing with FIG. 4, the first document object styles may also be represented by a unique first document object style hash. In general, a document object style hash is broadly meant to include any encoded representation of a document object style or its document object style attributes. In this particular example, first document object style 402 comprises first document style attributes 406 that have been hashed to generate first document object style hash 408, and thus, first document object style hash 408 uniquely represents first document style attributes 406 and first document object style 402. Likewise, first document object style 410 comprises first document style attributes 414 that have been hashed to generate first document object style hash 416, and thus, first document object style hash 416 uniquely represents first document style attributes 414 and first document object style 410.

Referring now to FIG. 5, second document data 500 comprises second document object styles, such as second document object style 502 and second document object style 510. In general, the second document object styles are representative of those that may be provided as the plurality of second document objects 302a-302d of FIG. 3. With reference still to FIG. 5, each of the second document object styles may have a second document style ID that uniquely identifies the second document object styles. In the illustrated example, second document object style 502 is associated with second document object style ID 504 to identify second document object style 502 in second document data 500. Similarly, second document object style 510 is associated with second document object style ID 512 to identify second document object style 510 in second document data 500.

Moreover, each of the second document object styles may have one or more second document object style attributes that visually effect a document object to which the second document object styles are applied. In this example, second document object style 502 comprises second document object style attributes 506, which also includes, center, bold, all caps, blue color, and times new roman eighteen point font, and happens to be the same as first document style attributes 406. Likewise, second document object style 510 comprises second document object style attributes 514, which define the geometric shape as a star, centered, 3-inch by 3-inch size, bold edge, and having a 3-dimensional effect, which happens to be different from second document object style attributes 514. As an illustrative example, second document object style 502 may be applied to and correspond with the visual effect of second document object 302a, while second document object style 510 may be applied to and correspond with the visual effect of second document object 302c in FIG. 3.

Continuing with FIG. 5, the second document object styles may also be represented by a unique second document object style hash. In this particular example, second document object style 502 comprises second document object style attributes 506 that have been hashed to generate second document object style hash 508. Thus, second document object style hash 508 uniquely represents second document object style attributes 506 and second document object style 502. Likewise, second document object style 510 comprises second document object style attributes 514 that have been hashed to generate second document object style hash 516. Thus, second document object style hash 516 uniquely represents second document object style attributes 514 and second document object style 510.

Turning back to FIG. 1, as noted, styles can be associated with hashes that provide an encoded representation of the style attributes. To generate the unique hashes from the style attributes, components of FIG. 1, such as server 102 or computing device 104 may employ hashing engine 120 of detection engine 110.

As will be further described, detection engine 110 generally detects conflicts between styles of documents, such as first document 114 and second document 116. In part, detection engine 110 does so by comparing hashes representing styles within the documents. Hashing engine 120 may be employed to generate hashes for any of the styles within first document 114 and second document 116 so that the hashes may be compared when detecting conflicts.

To generate hashes, such as a first document object style hash associated with first document 114 and a second document object style hash associated with second document 116, hashing engine 120 may generally employ any algorithm that is suitable for encoding the style information, illustrated in FIG. 1 as hashing algorithm 130. Some examples include MD-5 (message digest-5), RIPEMD (RIPE message digest), SHAs (secure hash algorithms), or Whirlpool, among other cryptographic algorithms. MD-5 has been identified as one suitable example that outputs a 128-bit hash value that can be used by components of operating environment 100, such as detection engine 110, to identify conflicts between documents styles.

To generate a document object style hash, hashing engine 120 can use the style attributes of a style as an input to hashing algorithm 130. In an aspect, the style attributes are arranged in a standardized format, and the style attributes in the standardized format are input by hashing engine 120 into hashing algorithm 130 to generate the document object style hash. One example standardized input that has been found suitable for use with the present technology includes JSON (JavaScript Object Notation) format. As such, hashing engine 120 may identify the style attributes from document data and translate the style attributes into a standardized format, such as JSON format, and provide the style attributes to hashing algorithm 130 to generate the document object style hash. In this way, hashing algorithm 130 outputs the same document object style hash for styles having the same document attributes, since the inputs are the same and in a standardized format. As such, the output document object style hashes can be used to identify whether document objects within different documents have the same style.

Figure 6:
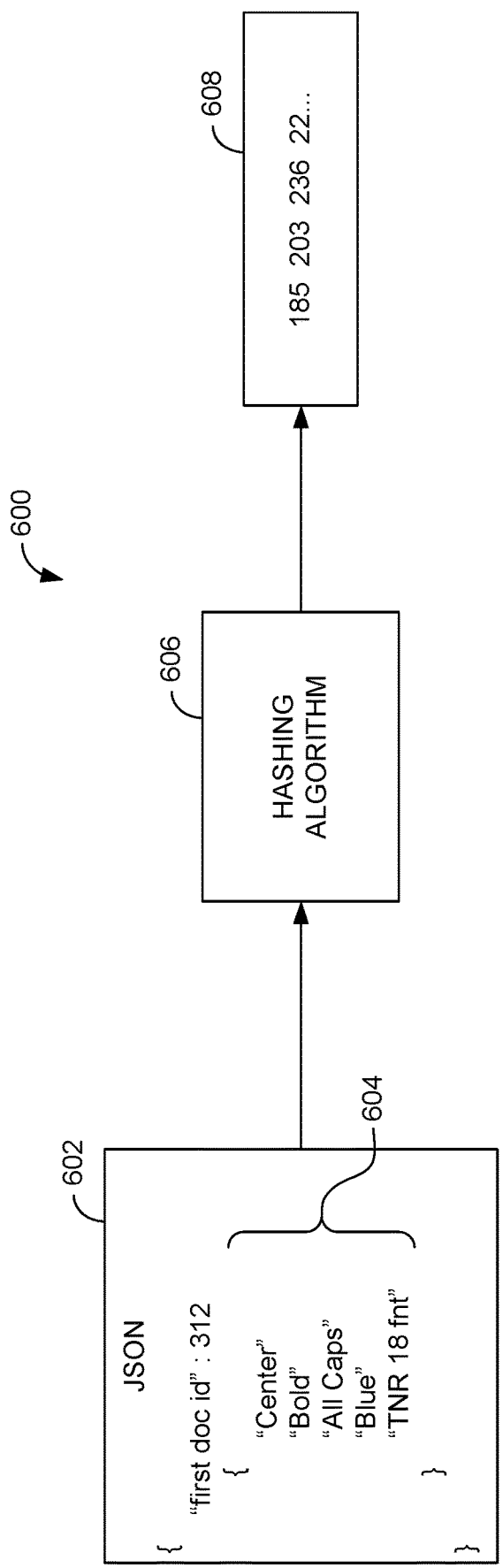
FIG. 6 is an example process for generating a document object style hash, in accordance with an aspect described herein.

FIG. 6 illustrates example process 600 showing one example method of generating a document object style hash. Here, process 600 illustrates JSON file 602 that comprises style attributes 604 in a standard JSON format. JSON file 602 is used as an input to hashing algorithm 606. Those hashing algorithms described with reference to hashing algorithm 130 of FIG. 1 can be used as hashing algorithm 606. The output of hashing algorithm 606 is document object style hash 608, which is an encoded representation of style attributes 604. Document object style hash 608 can then be included within document data for a document. For instance, the example process 600 illustrates one manner in which first document style attributes 406 of first document object style 402 in FIG. 4 can be used to generate first document object style hash 408.

Turning back to FIG. 1, having generated a document object style hash using hashing engine 120, the document object style hash can be saved in document data, such as metadata associated with a document. Thus, hashing engine 120 can generate a first document object style hash for a first document object style of a first document object in first document 114, and the first document object style hash is saved in first document data associated with the first document. Likewise, hashing engine 120 can generate a second document object style hash for a second document object style of a second document object in second document 116, and the second document object style hash is saved in second document data associated with the second document.

In some instances, detection engine 110 may detect conflicts between documents when a document is accessed at a computing device, or when otherwise prompted. For instance, document accessor 118 generally accesses a document so that the styles can be compared by other components of detection engine 110 to determine conflicts between the accessed documents. As an example, when computing device 104 generates or otherwise opens first document 114, document accessor 118 can be employed to access or otherwise identify a corresponding document stored remotely, such as second document 116 in some cases.

Upon accessing second document 116, modification engine 112 can be employed to identify whether there are any conflicts between the styles in first document 114 and second document 116. As noted, this may be done by comparing the first document object style hash with the second document object style hash. To compare hashes, conflict identifier 122 may identify the first document object style hash from the first document data and the second document object style hash from the second document data. Where the hashes are the same, the style of the first document object is the same as the style of the second document object and there is no conflict. When the hashes are different, then a conflict is identified, as the first document object hash a different style than the second document object.

To illustrate, FIG. 7 provides a table 700 having a comparison between first document object style hashes 702, which correspond with first document data 400 of first document 200, and second document object style hashes 704, which correspond with second document data 500 of second document 300. Here, the hash values between first document object style hashes 702 and second document object style hashes 704 are compared, and where the hash values are the same conflict indicator 706 indicates there is no conflict, in this case, using the indicator "1" as an example. Where the hash values are different, conflict indicator 706 indicates there is a conflict preset between a first document object style and a second document object style respectively associated with the document object styles hashes, as illustrated using the indicator "0." The conflict indicator notation is just one example, and it will be realized that other indicators and methods for identifying conflicts may be used.

To illustrate a specific example, first document object style hash 408 is compared to second document object style hash 508 in FIG. 7. Since these are the same, there is no conflict, as indicated by first conflict indicator 708. However, in a second example, first document object style hash 416 is compared to second document object style hash 516, and these do not have the same values. As such, there is a conflict between the respective document object styles, as indicated by second conflict indicator 710.

The example conflict identified in FIG. 7 can be visualized by comparing portions of FIG. 2 and FIG. 3. In FIG. 2, first document 200 has first document object 202c. As illustrated, first document object 202c corresponds to second document object 302c of second document 300 in FIG. 3. However, visually, the effects are different between first document object 202c and second document object 302c, thus indicating each has a different style defined by different style attributes. This can be seen looking at FIG. 4, showing that first document style attributes 414 for first document object style 410 associated with first document object 202c are different from second document object style attributes 514 for second document object style 510 associated with second document object 302c, in that second document object style attributes 514 comprise an additional 3-dimensional style attribute, which makes the visual effect different between first document object 202c and second document object 302c. This is one illustrative example where detection engine 110 is employed to detect conflicts between documents.

In aspects, conflicts between documents may be resolved by modifying a document so the styles are consistent. Modification engine 112 may be employed generally to modify a document in a manner consistent with another document. For instance, modification engine 112 may be employed to modify first document 114 to have a style consistent with second document 116. In aspects, modification engine 112 is employed to modify first document 114 in response to detection engine 110 detecting conflicts between first document 114 and second document 116.

In an aspect, modification engine 112 modifies the first document object by modifying the associated style attributes so the modified style attributes of the first document object match the style attributes of the second document object. In this way, the modified first document object has a visual effect consistent with the corresponding second document object. For instance, in response to identifying a conflict between the style of the first document object and the second documents object, modification engine 112 may identify the style attributes associated with the second document object from the second document data. These style attributes may then be applied to the first document object to change its visual effect in a manner consistent with the second document object.

To modify documents, modification engine 112 may employ input component 124, in an aspect. In general, input component 124 may initiate and provide a prompt at computing device 104 indicating conflicts have been detected by detection engine 110. In some cases, the prompt requests input to proceed with modifying first document 114. Input may be received by input component 124 that indicates a user wishes to proceed with modifying first document 114 in a consistent manner. In another aspect, modification engine 112 modifies first document 114 without requesting input via input component 124.

Document modifier 126 generally modifies a document. Continuing with the example provided in FIG. 1, document modifier 126 may modify first document 114 to be consistent with second document 116. Document modifier 126 may modify all of, or a portion of, first document 114 to be consistent with all of, or a portion of, second document 116. In aspects, document modifier 126 modifies one or more document objects, such as the first document object, to generate modified document objects, such as a first modified document object.

For example, document modifier 126 may modify the first document object in response to detection engine 110 identifying a conflict between the first document object style and the second document object style. Document modifier 126 identifies the styles attributes of the second document object style that are included in the second document data. Document modifier 126 changes one or more of the style attributes of the first document object to be the same as those style attributes of the second document object, thus modifying the visual effect of the first document object so the first modified document object has a consistent effect as the second document object.

Document data modifier 128 may be employed by modification engine 112 to update document data, such as the first document data or the second document data. In an aspect document data modifier 128 updates the document data for the modified document, which is the first document in the example provided by FIG. 1. Document data modifier 128 may do this in response to document modifier 126 modifying the first document 114.

As noted, first document 114 is associated with first document data, which may be stored in a datastore, such as datastore 106, or may be stored as metadata to first document 114. The first document data, as discussed, may include styles and style attributes that are associated with objects in first document 114. When a conflict has been identified or the first document 114 has been modified by document modifier 126, document data modifier 128 can identify the stored style and associated information, such as the style attributes and document object style hashes, and replace these with modified data associated with the modified document object.

For instance, the first document object is modified so that the first document object style corresponds to the second document object style. Thus, document data modifier 128 can update the stored information associated with the now modified first document object to match that associated with the second document object, including the style attributes and the first document object style hash. The modified document data can be stored in association with the modified first document for future use by components of operating environment 100.

Figure 8:
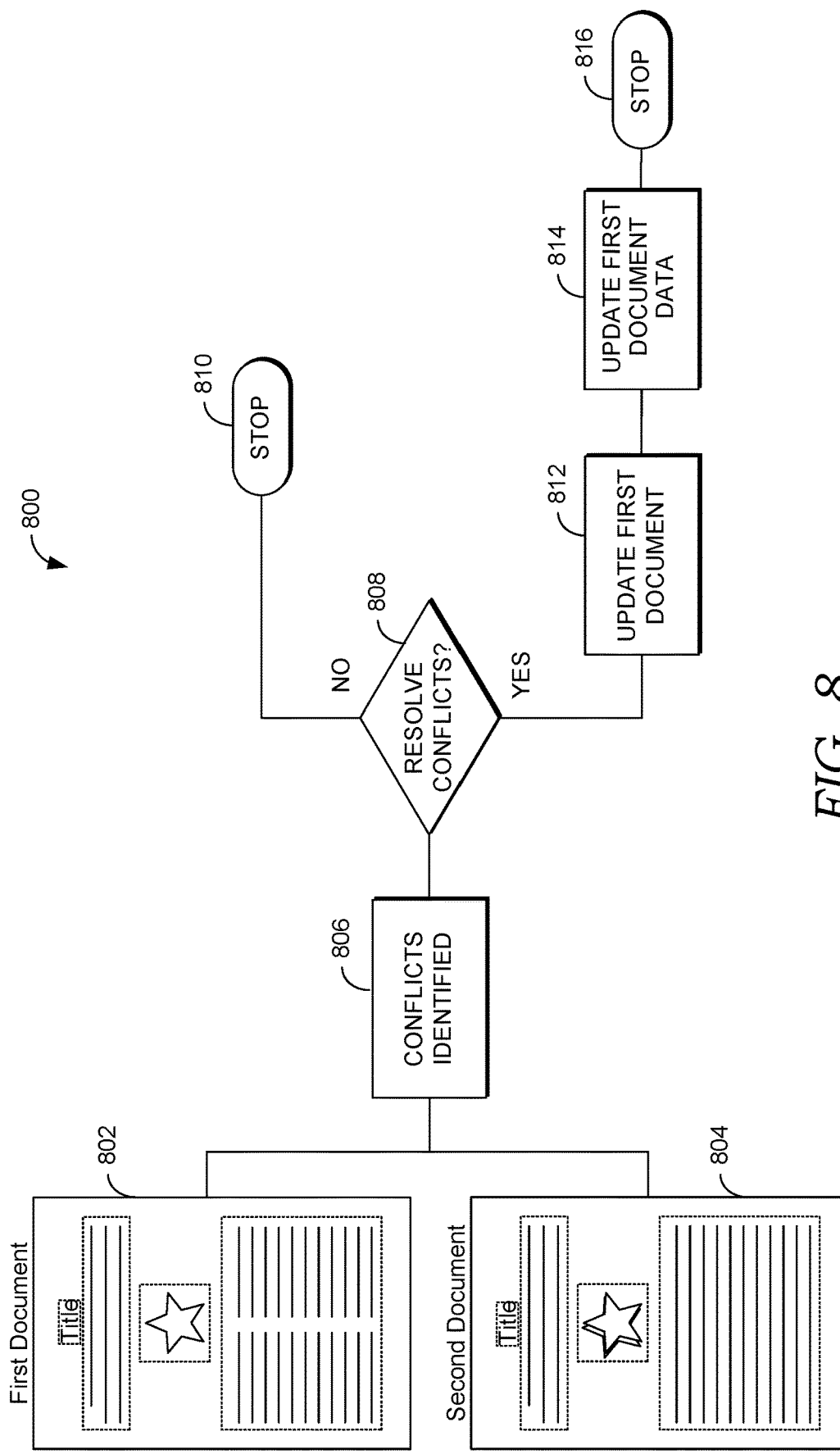
FIG. 8 is a process flow diagram for identifying and resolving conflicts using components described with respect to FIG. 1, in accordance with an aspect described herein.

An example process using detection engine 110 and modification engine 112 of FIG. 1 is illustrated by FIG. 8. Here, process 800 illustrates a process in which conflicts are identified between first document 802 and second document 804.

In general, first document 802 is one example of a document that may correspond with first document 114 of FIG. 1, while first document 802 similarly may correspond with second document 116, for example. In process 800 provided by FIG. 8, at step 806 it is determined whether there are any conflicts detected between styles of first document 802 and second document 804. This may be done using detection engine 110 of FIG. 1. For instance, detection engine 110 may compare document object style hashes for document objects within first document 802 and document objects provided by second document 804. In this example, at least one document object style hash associated with first document 802 does not match a document object style hash of a corresponding document object provided by, e.g., illustrated within or described by second document 804. As such, there is at least one conflict between the two documents.

Based on determining there is at least one conflict, process 800 at step 808 generates an input prompt to ask whether the conflict should be resolved. Here, the input prompt may be provided at a computing device to request an input whether to proceed resolving the conflict, e.g., modifying the first document 802 and updating associated first document data. This may be done by input component 124 of operating environment 100, for instance. In an aspect, an input indicates conflicts are not to be resolved and process 800 proceeds to stop 810. If the input indicates the detected conflicts are to be resolved, then process 800 proceeds to step 812. In aspects, a preset instruction automatically determines whether process 800 proceeds to stop 810 or step 812 in response to detecting a conflict.

As noted, if conflicts are to be resolved, process 800 may proceed to step 812 where first document 802 is modified to generate a modified first document. This may be done using document modifier 126 of FIG. 1. Here, the document object within first document 802 associated with the conflict is modified to have a visual effect corresponding to the visual effect of the document object in second document 804. This may be done by modifying the style attributes to apply a style to the document object in first document 802 that is also applied to the document object in second document 804, thereby modifying first document 802 in a manner consistent with second document 804.

At step 814, the first document data associated with the first document is modified to generate modified first document data. The modified first document data may include the style, style ID, style attributes, and document object style hashes that are associated with the style of second document 804 that is now applied to the document object of first document 802 by document modifier 126. The modified first document data is stored in association with the modified first document for future use. For instance, at a subsequent time, the modified first document may be again modified to be consistent with any subsequent changes made to second document 804 in the manners previously described.

Figure 9:
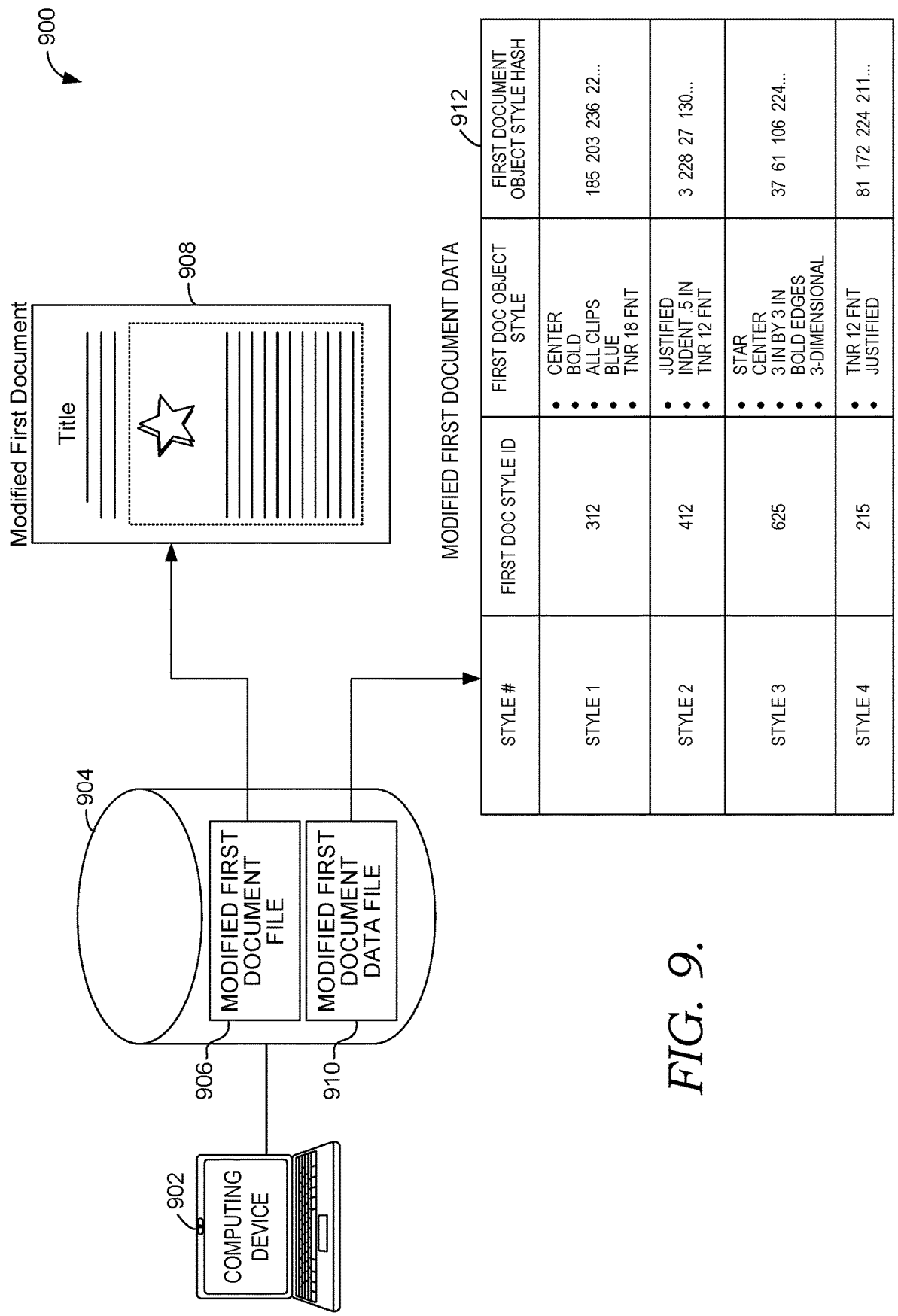
FIG. 9 illustrates a modified first document and modified first document data resulting from the process of FIG. 8, in accordance with an aspect described herein.

The modification to first document 802 and its associated first document data is illustrated in FIG. 9. With reference now to FIGS. 8 and 9, computing device 902, which may correspond to any of those described, such as computing device 104 of FIG. 1, may be used to facilitate modification of first document 802, locally or remotely using modification engine 112 of FIG. 1, using process 800 described in FIG. 8.

As illustrated in FIG. 9, modified first document 908 is stored locally or remotely in datastore 904 as modified first document file 906. Modified first document 908 is stored in association with modified first document data 912 as modified first document data file 910. In aspects, modified first document data 912 is stored as metadata for modified first document 908. As modified first document 908 and updated first document data file 910 have been updated and are now consistent in style with second document 804, the associated updated first document file 906 and modified first document data file 910 are available for use by components of FIG. 1. After modifying the first document or the first document data, process 800 may proceed to stop 816.

With reference now to FIGS. 6-9, flow diagrams are provided respectively illustrating methods 1000, 1100, and 1200 for modifying documents. Each block of methods 1000, 1100, and 1200 and any other methods described herein, may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few possibilities. Methods 1000, 1100, and 1200 may be implemented in whole or in part by components of operating environment 100.

Figure 10:
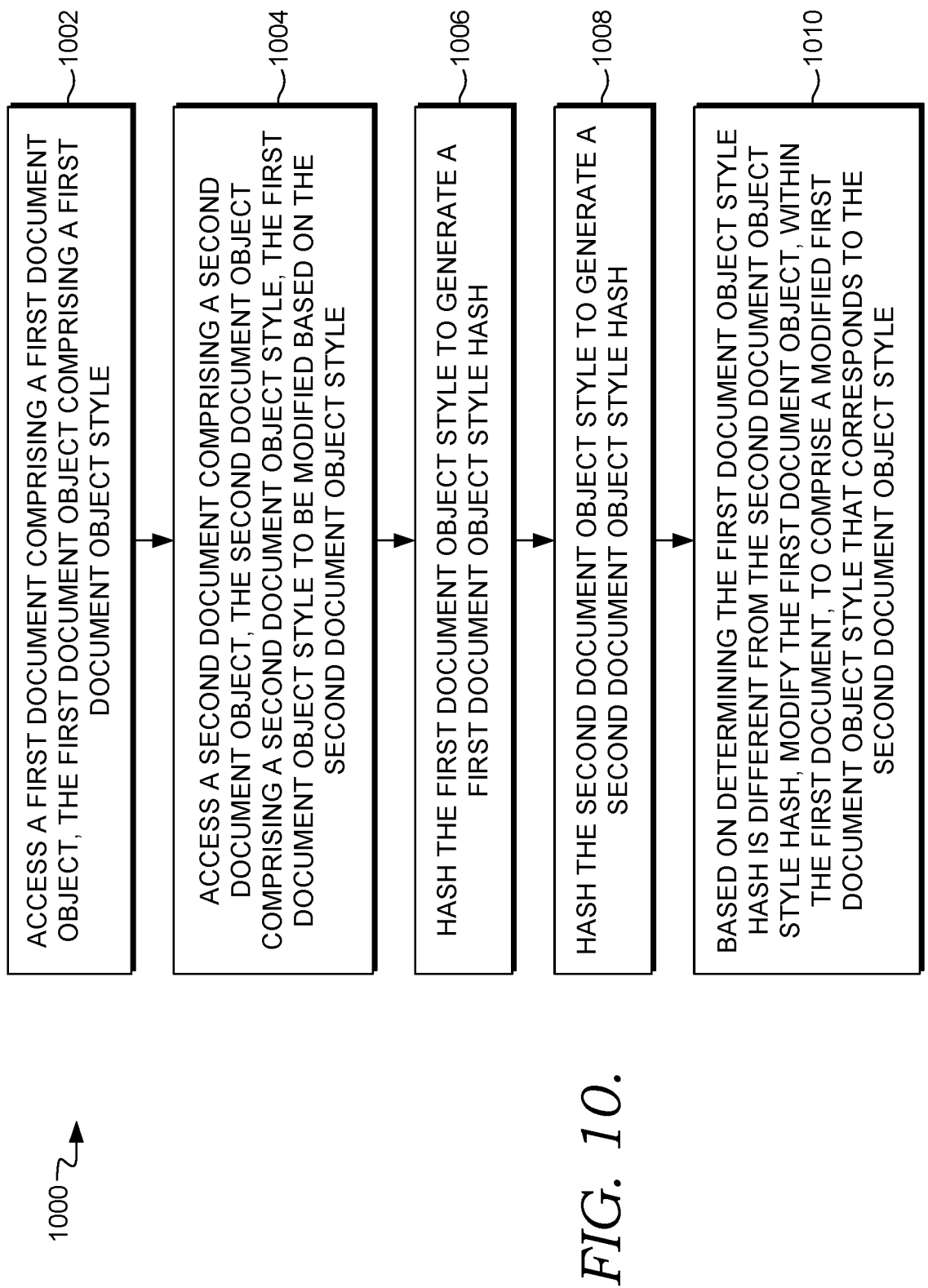
FIGS. 10-12 illustrate flow diagrams having example methods for modifying a document in a manner consistent with another document.

Referring now to FIG. 10 and with continued reference to FIG. 1, a method 1000 of modifying a document is provided. At block 1002, a first document is accessed. In an example, computing device 104 accesses the first document. The first document may be generated or otherwise opened by computing device 104. The first document comprises a first document object, and the first document object has a first document object style. The first document object style gives the first document object a visual effect. The first document object style comprises one or more style attributes that define the visual effect of the first document object. In a specific example, the first document object is a text object, and the text object comprises one or more style attributes that define visual effect for the text object.

At block 1004, a second document is accessed. The second document may be accessed by computing device 104. The second document may be stored at a remote database and maintained by a separate entity that defines styles for formatting the first document using the second document. The second document comprises a second document object, and the second document object has a second document object style. The second document object style comprise, e.g., illustrates or describes, a visual effect for the second document object. The second document object style comprises one or more style attributes that define the visual effect of the second document object. The first document is to be modified based on the second document. In a specific example, the second document object is a text object, and the text object comprises one or more style attributes that define visual effect for the text object.

At block 1006, the first document object style is hashed to generate a first document object style hash. This may be performed by hashing engine 120 using hashing algorithm 130. To hash the first document object style, the associated style attributes may be input into the a hashing algorithm, such as hashing algorithm 130, which outputs the first document object style hash in response. As an example, the style attributes of the first document object style can be written in JSON format, and the resulting JSON file may be provided as the input. In an aspect, the first document object style hash comprises a 128-bit hash value. For instance, this may be generated using an MD-5 algorithm.

At block 1008, the second document object style is hashed to generate a second document object style hash. This may be performed by hashing engine 120 using hashing algorithm 130. To hash the second document object style, the associated style attributes may be input into the a hashing algorithm, such as hashing algorithm 130, which outputs the second document object style hash in response. As an example, the style attributes of the second document object style can be written in JSON format, and the resulting JSON file may be provided as the input. In an aspect, the second document object style hash comprises a 128-bit hash value. For instance, this may be generated using an MD-5 algorithm. In aspect, the same hashing algorithm used to generate the first document object style hash is used to generate the second document object style hash.

At block 1010, the first document is modified. The first document may be modified using document modifier 126. The first document can be modified such that a first document object has a style that is the same as the style of a second document object. That is, the style attributes of the first document object can be modified to be the same as the second style attributes of the second document object, giving both objects the same visual effect when provided in a document. In some cases, the first document is modified subsequent to determining the first document object style hash is different from the second document object style hash, thereby indicating a conflict between the styles. The first document may be automatically modified or may be modified responsive to an input requesting the conflict be resolved.

Upon modifying the first document object within the first document, the first document object thereby comprises a modified document object style. The modified document object style may correspond to the second document object style. That is, the style attributes defining modified first document object's visual effects include one or more style attributes that are the same as the style attributes associated with the second document object style.

In an aspect, the first document is associated with first document data. The first document data may comprise the style attributes of the first document object. When the first document object is modified to generate the modified first document object of the modified first document, the first document data can also be modified, e.g., by document data modifier 128, to include the style attributes corresponding to the second document object style, thereby generating a modified first document data that is saved in association with the modified first document.

In some aspects, the style associated with the modified first document object is also hashed. This can be done using hashing engine 120 to generate a modified first document object style hash. The modified first document object style hash is compared to the second document object style hash. If the hashes are the same, the first document object style hash in the first document data is replaced with the modified first document object style hash to, at least in part, form the modified first document data.

Once modified, the modified first document comprises one or more document objects that have the same visual effects as illustrated or defined by the second document. The modified first document may be saved in association with the modified first document data in a datastore. The modified first document may be further modified by components of operating environment 100 based on subsequent changes to styles provided in the second document.

Figure 11:
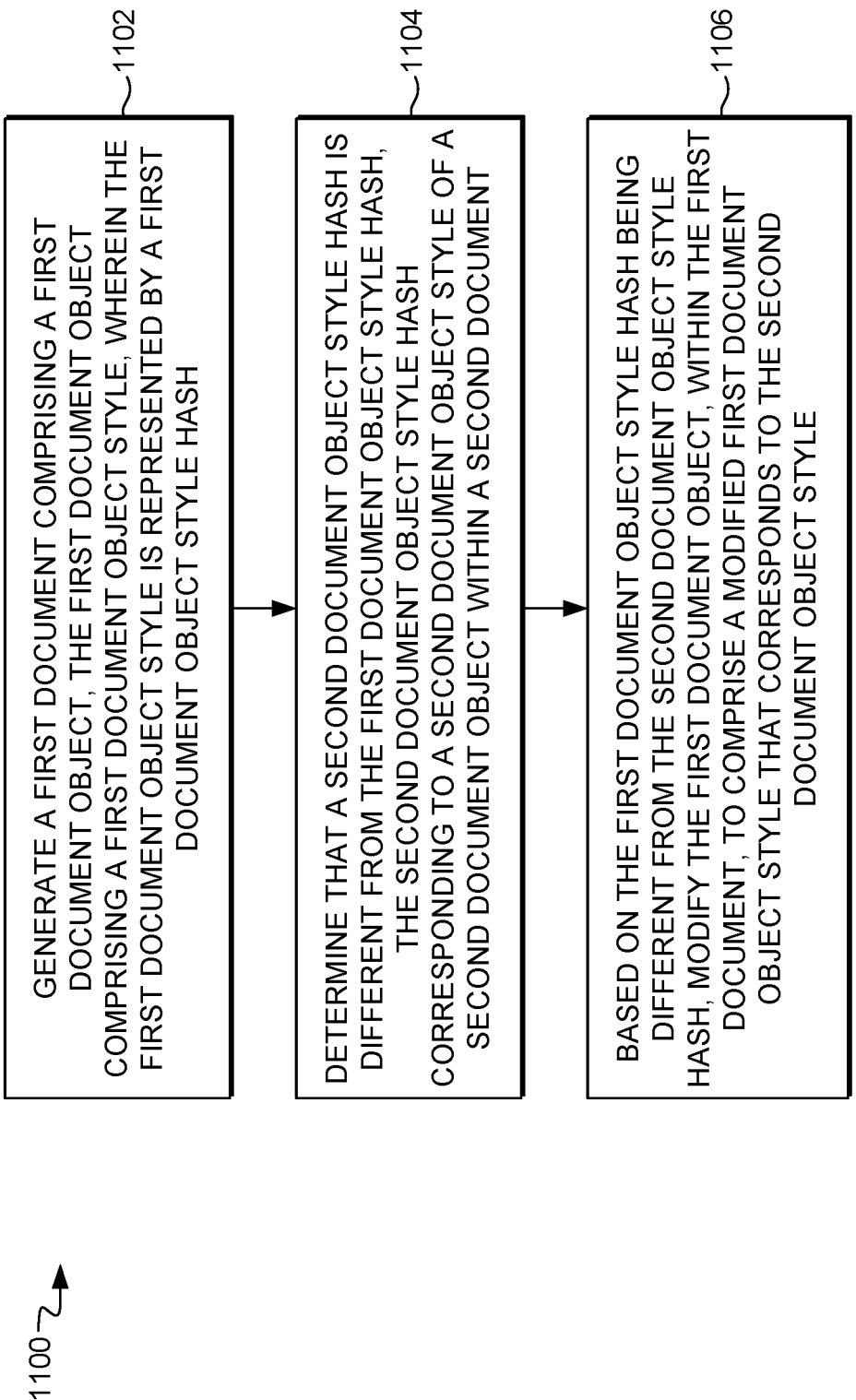

Turning now to FIG. 11 and continued reference to FIG. 1, another example method 1100 for modifying a document is provided. At block 1102, a first document is generated. Generating a first document may comprise generating a new document, creating a new version of an existing document, creating a document from a template, updating an existing document, or other like method. The first document may be generated at computing device 104.

The first document comprises a first document object, and the first document object has a first document object style. The first document object style gives the first document object a visual effect. The first document object style comprises one or more style attributes that define the visual effect of the first document object. In a specific example, the first document object is a text object, and the text object comprises one or more style attributes that define visual effect for the text object.

The first document object style is represented by a first document object style hash. For instance, the first document object style hash may be generated using a hashing algorithm. Hashing engine 120 can employ hashing algorithm 130 to generate the first document object style hash by hashing the associated one or more style attributes. The one or more style attributes may be provided in a standard format, such as a JSON format, as an input to the hashing algorithm to generate the first document object style hash.

At block 1104, there is a determination that a second document object style hash is different from the first document object style hash. This may be done using conflict identifier 122, for instance. The second document object style hash corresponds to a second document object of a second document. In an aspect, the second document object style hash been generated from a hashing algorithm that is the same as the hashing algorithm used to generate the first document object style hash. In an aspect, an MD-5 algorithm is used to generate the hashes. The hash values may each be a 128-bit hash value.

At block 1106, the first document object is modified. This may be done by employing document modifier 126, for instance. The first document object may be modified based on the first document object style hash having been determined different from the second document object style hash. The first document object is modified within the first document such that the modified first object comprises a style that corresponds to the second document object style, e.g., having one or more style attributes that are the same as the style attributes of the second document object style, thereby generating a modified first document.

In some cases, the style attributes of the modified first document object style are hashed. The resulting modified first document object style hash is saved with association with modified first document data. In a particular example, the modified first document object style hash is compared to the second document object style hash, and is saved in respond to determining they are same.

Figure 12:
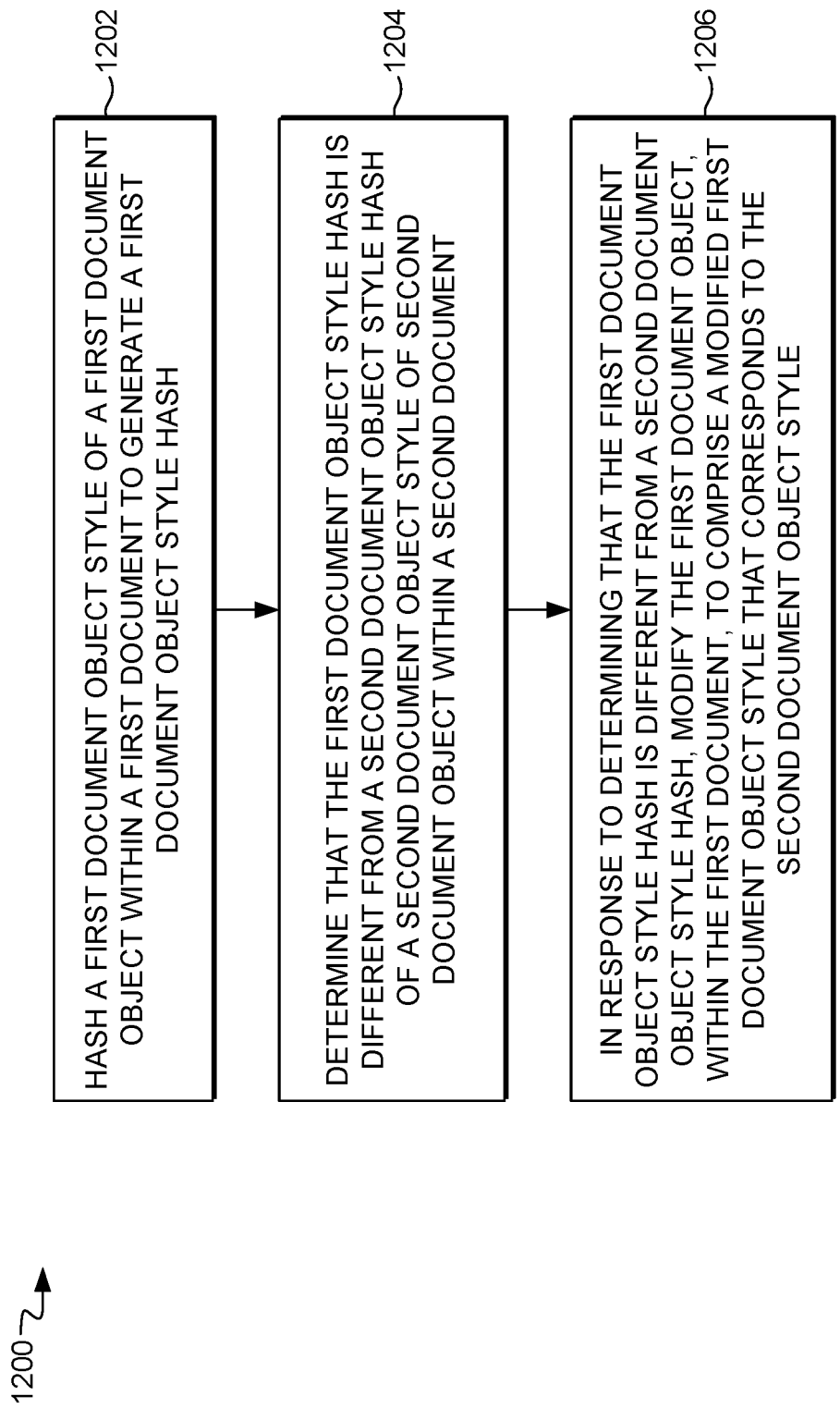

Now referring to FIG. 12 and with continued reference to FIG. 1, another example method 1200 for modifying a document is provided. At block 1202, a first document object style is hashed. The first document object style is associated with a first document object of a first document. The first document object style may be hashed using hashing engine 120 employing hashing algorithm 130 by inputting one or more style attributes of the first document object style. In an aspect, this may be done in a standard format, such as a JSON format. In an aspect, the first document object style hash is a 128-bit hash value. One example algorithm that can be used is an MD-5 algorithm.

At block 1204, it is determined the first document object style hash is different from a second document object style hash. This may be done using conflict identifier 122, for instance. The second document object style hash corresponds to a second document object of a second document. In an aspect, the second document object style hash has been generated from a hashing algorithm that is the same as the hashing algorithm used to generate the first document object style hash.

At block 1206, the first document object is modified. This may be done by employing document modifier 126, for instance. The first document object may be modified in response to the first document object style hash having been determined different from the second document object style hash. The first document object is modified within the first document such that the modified first object comprises a style that corresponds to the second document object style, e.g., having one or more style attributes that are the same as the style attributes of the second document object style, thereby generating a modified first document.

In some cases, the style attributes of the modified first document object style are hashed. The resulting modified first document object style hash is saved with association with modified first document data. In a particular example, the modified first document object style hash is compared to the second document object style hash, and is saved in respond to determining they are same.

Figure 13:
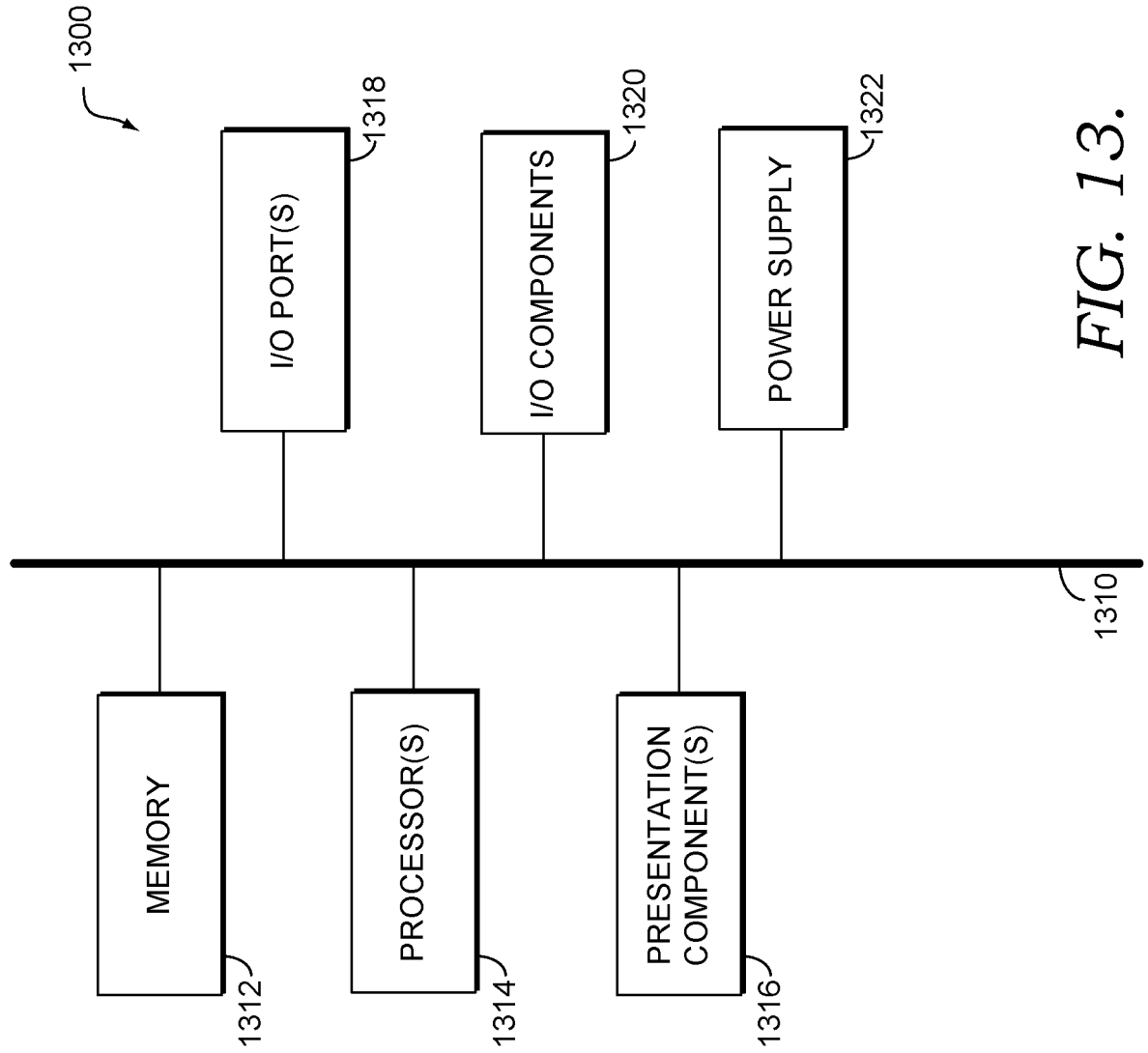
FIG. 13 illustrates an example computing device suitable for implementing aspects of the present technology.

Having described an overview of some embodiments of the present technology, an example computing environment in which embodiments of the present technology may be implemented is described below in order to provide a general context for various aspects of the present technology. Referring now to FIG. 13 in particular, an exemplary operating environment for implementing embodiments of the present technology is shown and designated generally as computing device 1300. Computing device 1300 is but one example of a suitable computing environment and is not intended to suggest any limitation as to the scope of use or functionality of the technology. Neither should computing device 1300 be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that performs particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices linked through a communications network.

With reference to FIG. 13, computing device 1300 includes bus 1310 that directly or indirectly couples the following devices: memory 1312; one or more processors 1314; one or more presentation components 1316; input/output (I/O) ports 1318; input/output components 1320; and illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors recognize that is the nature of the art, and reiterate that the diagram of FIG. 13 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 13 and with reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM; ROM; EEPROM; flash memory or other memory technology; CD-ROM; digital versatile disks (DVD) or other optical disk storage; magnetic cassettes; magnetic tape; magnetic disk storage or other magnetic storage devices; or any other medium which can be used to store the desired information and which can be accessed by computing device 1300. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of computer-readable media.

Memory 1312 includes computer-storage media in the form of volatile or nonvolatile memory. The memory may be removable, non-removable, or a combination thereof. Exemplary hardware devices include solid-state memory, hard drives, optical-disc drives, etc. Computing device 1300 includes one or more processors that read data from various entities, such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices, including I/O components 1320, some of which may be built in. Illustrative components include a microphone, joystick, game pad, satellite dish, scanner, printer, wireless device, etc. The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1300. Computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of computing device 1300 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low level software written in machine code; higher level software, such as application software; and any combination thereof. In this regard, components for preserving machine learning model can manage resources and provide the described functionality. Any other variations and combinations thereof are contemplated with embodiments of the present technology.

Having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words have the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects that may be derived from the foregoing description include, but are not limited to the following:

Aspect 1: A method comprising: accessing a first document comprising a first document object, the first document object comprising a first document object style; accessing a second document comprising a second document object, the second document object comprising a second document object style, the first document object style to be modified based on the second document object style; hashing the first document object style to generate a first document object style hash; hashing the second document object style to generate a second document object style hash; and based on determining the first document object style hash is different from the second document object style hash, modifying the first document object, within the first document, to comprise a modified first document object style that corresponds to the second document object style.

Aspect 2: A system comprising: a memory component; and a processing device coupled to the memory component, the processing device to perform operations comprising: generating a first document comprising a first document object, the first document object comprising a first document object style, wherein the first document object style is represented by a first document object style hash; determining that a second document object style hash is different from the first document object style hash, the second document object style hash corresponding to a second document object style of a second document object within a second document; and based on the first document object style hash being different from the second document object style hash, modifying the first document object, within the first document, to comprise a modified first document object style that corresponds to the second document object style.

Aspect 3: One or more non-transitory computer-readable medium storing executable instructions, which when executed by a processing device, cause the processing device to perform operations comprising: hashing a first document object style of a first document object within a first document to generate a first document object style hash; determining that the first document object style hash is different from a second document object style hash of a second document object style of second document object within a second document; and in response to determining that the first document object style hash is different from a second document object style hash, modifying the first document object, within the first document, to comprise a modified first document object style that corresponds to the second document object style.

Aspect 4: Any of Aspects 1-3, wherein each of the first document object style hash or the second document object style hash comprises a 128-bit hash value.

Aspect 5: Any of Aspects 1-4, wherein hashing of the first document object style or the second document object style is performed using an MD-5 (message digest-5) algorithm.

Aspect 6: Any of Aspects 1-5, wherein the first document object style is represented in a first JSON (JavaScript Object Notation) format and the second document object style is represented in a second JSON format.

Aspect 7: Aspect 6, further comprising hashing the first document object style further comprises inputting the first JSON format into a hashing algorithm; and hashing the second document object style further comprises inputting the second JSON format into the hashing algorithm.

Aspect 8: Any of Aspects 1-7, further comprising: hashing the modified first document object style to generate a modified first document object style hash; determining that the modified first document object style hash matches the second document object style hash; and based on determining that the modified first document object style hash matches the second document object style hash, replacing the first document object style hash with the modified first document object style hash within metadata of the first document.

Any of Aspects 1-8, wherein the first document object or the second document object each comprises a text object and each of the first document object style or the second document object style respectively comprises one or more style attributes that define a visual effect for the text object.

What is claimed is:

1. A computerized method performed by one or more processors, the method comprising:

accessing a first document comprising a first document object and a second document object the first document object comprising a first document object style, and the second document object comprising a second document object style;
accessing a second document comprising a third document object, the third document object comprising a third document object style, the first document object style to be modified based on the third document object style;
hashing the first document object style and the second document object style to generate a first document object style hash and a second document object style hash;
hashing the third document object style to generate a third document object style hash;
based on comparing the first document object style hash and the second document object style hash to the third document object style hash, determining the first document object style hash is different from the third document object style hash and the second document object style hash matches the third document object style hash;
based on the first document object style hash being different from the third document object style hash, modifying the first document object, within the first document, to comprise a modified first document object style that corresponds to the third document object style; and
replacing the first document object style hash with the modified first document object style hash within metadata of the first document.

2. The computerized method of claim 1, wherein each of the first document object style hash and the second document object style hash comprises a 128-bit hash value.

3. The computerized method of claim 1, wherein the hashing of the first document object style and the second document object style is performed using an MD-5 (message digest-5) algorithm.

4. The computerized method of claim 1, wherein the first document object style is represented in a first JSON (JavaScript Object Notation) format and the second document object style is represented in a second JSON format.

5. The computerized method of claim 4, wherein:
hashing the first document object style further comprises inputting the first JSON format into a hashing algorithm; and
hashing the second document object style further comprises inputting the second JSON format into the hashing algorithm.

6. The computerized method of claim 1, further comprising:
hashing the modified first document object style to generate a modified first document object style hash;
determining that the modified first document object style hash matches the second document object style hash; and
based on determining that the modified first document object style hash matches the second document object style hash, replacing the first document object style hash with the modified first document object style hash within metadata of the first document.

7. The computerized method of claim 1, wherein the first document object and the second document object each comprises a text object and each of the first document object style and the second document object style respectively comprises one or more style attributes that define a visual effect for the text object.

8. A system comprising:
a memory component; and
a processing device coupled to the memory component, the processing device to perform operations comprising:
generating a first document comprising a first document object and a second document object, the first document object comprising a first document object style, and the second document object comprising a second document object style, wherein the first document object style is represented by a first document object style hash, and the second document object style is represented by a second document object style hash;
based on comparing the first document object style hash and the second document object style hash to a third document object style hash corresponding to a third document object style of a third document object within a second document, determining that the third document object style hash is different from the first document object style hash;
based on the first document object style hash being different from the third document object style hash, modifying the first document object, within the first document, to comprise a modified first document object style that corresponds to the third document object style; and
replacing the first document object style hash within the modified first document object style hash within metadata of the first document.

9. The system of claim 8, wherein each of the first document object style hash and the second document object style hash comprises a 128-bit hash value.

10. The system of claim 8, further comprising hashing the first document object style to generate the first document object style hash, wherein the hashing of the first document object style is performed using an MD-5 (message digest-5) algorithm.

11. The system of claim 8, wherein the first document object style is represented in a first JSON (JavaScript Object Notation) format.

12. The system of claim 11, further comprising hashing the first document object style to generate the first document object style hash by inputting the first JSON format into a hashing algorithm.

13. The system of claim 11, further comprising:
hashing the modified first document object style to generate a modified first document object style hash;
determining that the modified first document object style hash matches the second document object style hash; and
based on determining that the modified first document object style hash matches the second document object style hash, replacing the first document object style hash with the modified first document object style hash within metadata of the first document.

14. The system of claim 11, wherein the first document object comprises a text object and the first document object style comprises one or more style attributes that define a visual effect for the text object.

15. One or more non-transitory computer-readable medium storing executable instructions, which when executed by a processing device, cause the processing device to perform operations comprising:

hashing a first document object style of a first document object within a first document to generate a first document object style hash, and a second document object style of a second document object within the first document to generate a second document object style hash;

based on comparing the first document object style hash and the second document object style hash to a third document object style hash of a third document object style of a third document object within a second document, determining that the first document object style hash is different from the third document object style hash;

in response to determining that the first document object style hash is different from the third document object style hash, modifying the first document object, within the first document, to comprise a modified first document object style that corresponds to the third document object style; and replacing the first document object style hash with the modified first document object style hash within metadata of the first document.

16. The non-transitory computer-readable medium of claim 15, wherein each of the first document object style hash and the second document object style hash comprises a 128-bit hash value.

17. The non-transitory computer-readable medium of claim 15, wherein the hashing of the first document object style is performed using an MD-5 (message digest-5) algorithm.

18. The non-transitory computer-readable medium of claim 15, wherein the first document object style is represented in a first JSON (JavaScript Object Notation) format, and hashing the first document object style further comprises inputting the first JSON format into a hashing algorithm.

19. The non-transitory computer-readable medium of claim 15 further comprising:

hashing the modified first document object style to generate a modified first document object style hash;

determining that the modified first document object style hash matches the second document object style hash; and based on determining that the modified first document object style hash matches the second document object style hash, replacing the first document object style hash with the modified first document object style hash within metadata of the first document.

20. The non-transitory computer-readable medium of claim 15, wherein the first document object comprises a text object and the first document object style comprises one or more style attributes that define a visual effect for the text object.

\* \* \* \* \*